United States Patent [19]

Sakaguchi et al.

[11] Patent Number: 4,744,501
[45] Date of Patent: May 17, 1988

[54] METHOD OF PREVENTING SAG OF PANEL AND APPARATUS THEREFOR

[75] Inventors: Akira Sakaguchi, Kobe; Tsuneo Kinoshita, Takasago, both of Japan

[73] Assignee: Kawasaki Jukogyo Kabushiki Kaisha, Kobe, Japan

[21] Appl. No.: 930,184

[22] Filed: Nov. 13, 1986

[30] Foreign Application Priority Data

Dec. 6, 1985 [JP] Japan ............... 60-275298

[51] Int. Cl.⁴ .......................... B23K 31/00
[52] U.S. Cl. ..................... 228/102; 29/447
[58] Field of Search ............... 228/102, 175; 148/150, 148/154; 29/447, 448; 219/497

[56] References Cited

U.S. PATENT DOCUMENTS

| 1,427,753 | 8/1922 | Budd | 148/154 |
|---|---|---|---|
| 1,503,639 | 8/1924 | Cunningham | 148/154 |
| 3,020,867 | 2/1962 | Ballentini | |
| 3,082,519 | 3/1963 | Ballentini | |
| 3,737,978 | 6/1973 | Rathbun | |
| 3,769,675 | 11/1973 | Chaut | |
| 4,404,462 | 9/1983 | Murray | 219/497 |

FOREIGN PATENT DOCUMENTS

| 0070238 | 4/1982 | Japan | 148/150 |
|---|---|---|---|
| 0105285 | 6/1984 | Japan | 148/154 |
| 1037922 | 2/1986 | Japan | 148/154 |
| 1073822 | 4/1986 | Japan | 148/154 |

Primary Examiner—Fred Silverberg
Assistant Examiner—Karen Skillman
Attorney, Agent, or Firm—Schwartz & Weinrieb

[57] ABSTRACT

A method and apparatus for preventing a sag of a panel, in which plate to be attached to a skeleton is located on the skeleton supported by a support means, both end parts of the plate are gripped by grasp electrodes of a resistance heating device, current is caused to flow through the plate by the grasp electrodes so as to preheat the plate to a predetermined temperature and to thermally expand it, the plate is welded to the skeleton by a welding machine, and a residual tensile stress is developed in the plate by the thermal shrinkage deformation attendant upon cooling of the plate after the welding. In the case where the plate has a cut-away part, electric conduction members for short-circuiting the cut-away part are interposed in this part so as to form electric conduction paths for the preheating of the plate.

20 Claims, 4 Drawing Sheets

METHOD OF PREVENTING SAG OF PANEL AND APPARATUS THEREFOR

FIELD OF THE INVENTION

The present invention relates to a method of preventing the occurrence of "sag" of a panel which is used for assembling roof structures, side wall structures and the like of vehicles, ships, buildings and the like, and also to an apparatus therefor.

BACKGROUND OF THE INVENTION

In recent years, especially lightening of the type of structures as mentioned above with respect to their weight has been especially desired and emphasized, and thinning of the structures has accordingly been promoted. Soft steel, stainless steel, aluminum alloys or the like are usually applied to the plates of the panels. With the promotion of the thinning of the structures, "sag" of the plate after welding and assemblage inevitably arises, and problems are posed as to the local strength of a "sagging" part of the panel as well as the external appearance of the panel.

With the objective of eliminating the aforenoted welding distortion, there have accordingly been disclosed techniques wherein a large number of sheets of a standard shape are formed into an elongated plate by means of welding the sheets together, whereupon under the state in which the plate is loaded with a tensile stress, it is attached to a skeleton (refer to, for example, the official gazette of Japanese Patent Application Publication No. 53-39261), and additional techniques wherein the above plate formed to be elongate is loaded with the tensile stress and is also preheated so as to thermally expand the same, whereupon the plate is attached to the skeleton (refer to, for example, the official gazzette of Japanese Patent Application Publication No. 54-20185). Both of these techniques, however, require a large-scale tensioning device and heating device and involve enormous installation costs as well as a large number of process steps. As another drawback, it is not easy to precisely control the predetermined heating temperature. There has also been provided a technique wherein a plate of comparatively small size is disposed within a heating box, and the whole plate is heated to a predetermined temperature and is thereafter welded to a skeleton (refer to, for example, the official gazette of Japanese Patent Application Laid-open No. 60-64791). However, the heating box is complicated in structure. Moreover, as the plate becomes larger in size, the heating box needs to be proportionately larger in size, whereby problems of a large floor space and a workshop of large area are incurred and the installation cost becomes high.

Furthermore, there has also been disclosed a technique wherein a plate having an opening for a window or a door is placed upon a heat insulating material laid upon a surface table, and a heating means such as a heater or a hot iron plate is disposed upon the plate, while the heating means is compressed by a pressure application means such as a press, so as to heat the plate in contact therewith, the plate being thereafter welded to a skeleton (refer to, for example, the official gazzette of Japanese Patent Application Publication No. 53-39262). This technique, however, has the drawback that the heating means and the pressing means need to be larger in scale in proportion to the size of the plate and are therefore different to handle.

OBJECT OF THE INVENTION

In view of the problems of the prior art, the present invention has for its object to provide a method and apparatus for preventing the sag of a panel according to which the occurrence of the "sag" is prevented during the assemblage of a thin-walled structure.

SUMMARY OF THE INVENTION

As expedients for accomplishing the object of the present invention, the first aspect of performance of the invention is characterized by comprising the step of locating a plate upon a skeleton to which the plate is to be attached, the step of gripping both end parts of the plate with grasp electrodes of resistance heating means, the step of causing current to flow through the plate across the grasp electrodes so as to thereby preheat the plate to a predetermined temperature and to thermally expand it, the step of welding the plate to the skeleton, and the step of developing a residual tensile stress in the plate owing to the thermal shrinkage deformation attendant upon cooling of the plate after the welding. The second aspect of performance of the invention is characterized by comprising the step of locating a plate upon a skeleton to which the plate is to be attached, the step of gripping both end parts of the plate with grasp electrodes of resistance heating means and interposing electric conduction members, for short-circuiting a cut-away part of the plate, in the cut-away part so as to form electric conduction paths, the step of causing current to flow through the plate across the grasp electrodes so as to thereby preheat the plate to a predetermined temperature and to thermally expand it, the step of welding the plate to the skeleton, and the step of developing a residual tensile stress in the plate owing to the thermal shrinkage deformation attendant upon cooling of the plate after the welding. The third aspect of performance of the invention is characterized by comprising support means for supporting a skeleton, resistance heating means for preheating a plate, and weld means for welding the plate to the skeleton, the resistance heating means being made of grasp electrodes which detachably grip both end parts of the plate and which cause current to flow through the plate and including electric conduction members which are interposed in a cut-away part of the plate and which short-circuit the cut-away part.

As functions based on the expedients described above, the plate is preheated to the predetermined temperature so as to be thermally expanded by the grasp electrodes and the electric conduction members of the resistance heating means before being attached to the skeleton, and it is thereafter welded, so that the residual tensile stress capable of preventing the occurrence of the "sag" is developed in the plate by the thermal shrinkage deformation attendant the cooling process.

BRIEF DESCRIPTION OF THE DRAWINGS

The drawings exemplify the aspects of performance of the present invention, in which.

PREFERRED EMBODIMENT OF THE INVENTION

Now, embodiments of the present invention will be described with reference to the drawings.

Figure 1:
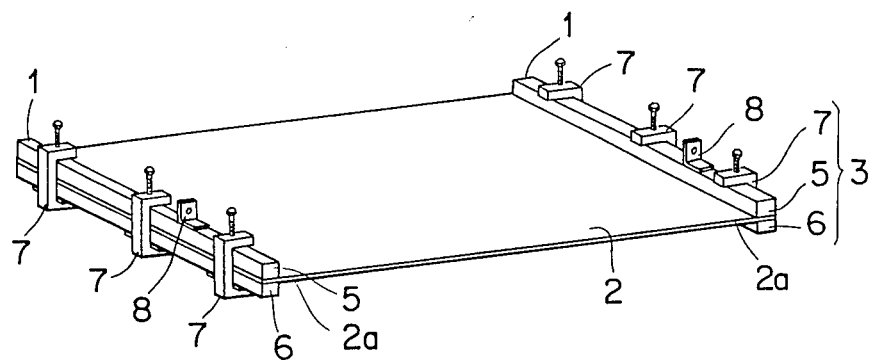
FIG. 1 is an outward perspective view showing a state in which both end parts of a plate are gripped by the grasp electrodes of the resistance heating means.
Figure 2:
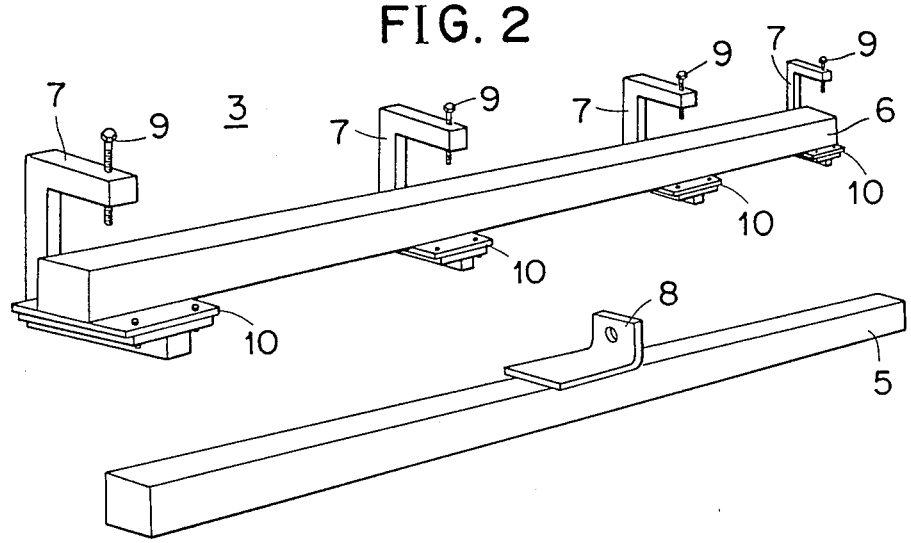
FIG. 2 is an outward perspective view showing the grasp electrodes in an exploded state.
Figure 3:
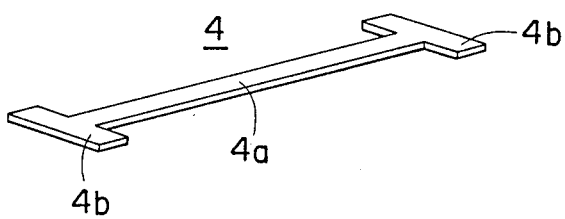
FIG. 3 is an outward perspective view of an electric conduction member.

Resistance heating means 1 shown in FIGS. 1 through 3 is applied in the case of fabricating a panel in which a plate 2 is coupled with a skeleton (not shown) having the plate attached thereto. An apparatus for preventing the sag of the panel (not generally shown) is constructed of a known supporting rest (not shown) made up of sleepers, bearers and the like, and is arranged on a floor in order to support the skeleton, the resistance heating means 1 for preheating the plate 2, and known welding means (not shown) made up of a spot welding machine or the like. The resistance heating means and the welding means are disposed so as to be movable relative to the skeleton, which is maintained horizontal at a proper height by the supporting means, and the plate which is located on the skeleton.

The resistance heating means 1 consists of grasp electrodes 3 and one or more electric conduction members 4. The grasp electrodes detachably grip both ends of the plate 2 (refer to FIG. 1) and directly cause current to flow so as to thereby heat the plate 2. As shown in FIG. 2, each grasp electrode comprises an upper electrode 5 and a lower electrode bar 6 which are made of a copper alloy material or the like, and clamps 7 which are made of a steel material or the like. In this embodiment, the upper electrode bar 5 and the lower electrode bar 6 are formed in the shapes of straight bars of rectangular sections, and a terminal piece 8 for connecting an electric wiring lead is fastened on the top surface of the upper electrode bar 5.

The clamps 7 each having a locking bolt 9 and a bracket 10 are arranged at positions of equal intervals in the lengthwise directions of both the electrode bars 5, 6 in order to ensure a uniform conduction performance. The upper electrode bar 5, the plate 2 and the lower electrode bar 6 are fixed and bound in pressed contact by the locking bolts and the brackets. In a case where prompt detachment is expected, known hand clamps may well be mounted on the upper electrode bar instead of the locking bolts.

Figure 6:
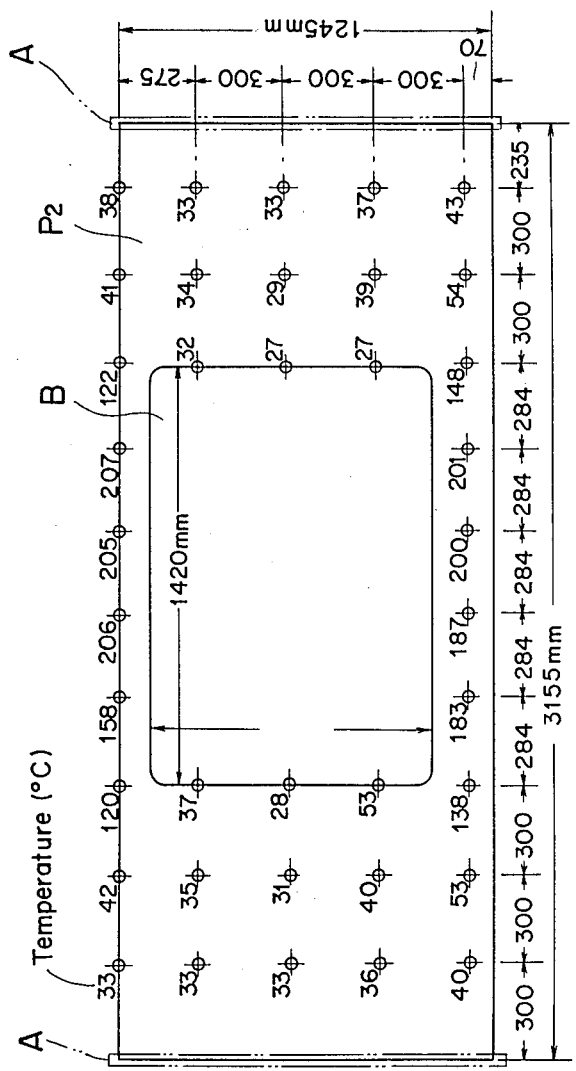
FIGS. 6 and 7 are diagrams each showing a temperature distribution characteristic of a heating test of a plate specimen which has a cut-away part.

The electric conduction member 4 serves to form a conduction path by short-circuiting the cut-away part or space of the plate 2 during the stage of preheating this plate by means of direct conduction. As shown in FIG. 3, this electric conduction member is formed in the shape of the letter I which has fitting portions 4b, 4b at both ends of a strip portion 4a, from an aluminum alloy plate 1.6 mm thick by way of example. It has the strip portion 4a interposed in the cut-away part (B in a heating test to be described later, and as shown in FIG. 6) and has the fitting portions 4b, 4b detachably fixed to the peripheral edge parts of the cut-away part B by known fixation and binding means such as hand clamps or vises, whereby the conduction path for short-circuiting the cut-away part is formed. In order to readily cope with changes in the shape of the cut-away part B, the electric conduction members 4 are prepared with various lengths, or they are sometimes formed of electric wires having appropriate cross-sectional areas. The direction of arrangement of the electric conduction members 4 is set to be parallel or angled with respect to the longitudinal direction of the grasp electrodes 3, 3 (the direction in which the current flows) as may be needed.

Next, there will be described a method of preventing the sag of a panel to which the resistance heating means 1 is applied.

First, the plate 2 is located on the skeleton maintained horizontal at the proper height by the supporting means arranged on the floor. Then, at a heating position to be preheated first, both end parts 2a, 2a of the plate 2 in the widthwise direction thereof are gripped by the grasp electrodes 3, 3 and are fixed and bound by the locking bolts 9, 9 . . . , while in the presence of the cut-away part or space B (refer to FIG. 6 or 7) in the plate 2, the electric conduction members 4 are fixed to the required parts of the cut-away part so as to form the conduction paths. Subsequently, current is fed through the plate 2 by the grasp electrodes 3, 3 to preheat this plate to a predetermined temperature T described later and to thermally expand it. Thereafter, the grasp electrodes 3, 3 are removed from the heating position, and they are moved to the next heating position and are caused to grip both widthwise end parts of the plate 2 in this position. In the meantime, the plate 2 in the first heating position is quickly tacked and welded to the skeleton. Furthermore, the plates 2 at and behind the next heating position are heated, tacked and finish-welded by repeating the same operations as described above. It has been experimentally verified that, when the tack welding is promptly and reliably carried out, the plate 2 wherein heat still remains will not develop a considerable tensile stress, and that the plate can generate a sufficient residual stress when reliably finish-welded. If the parts gripped by the grasp electrodes can be avoided as positions to-be-welded, it will pose substantially no problem to perform the finish welding without the tacking. In addition, a technique in which the grasp electrodes are partly cut away or bored for the purpose of the tack welding is very convenient because the plate can be tack-welded before the detachment of the electrodes. During the stage of the finish welding, spot welding is suitable for the panel of this type, and continuous welding such as arc welding is unsuitable because it gives rise to distortions. The plate 2 fixed to the skeleton by the finish welding develops a residual tensile stress in the plate 2 owing to the thermal shrinkage deformation attendant upon the subsequent natural cooling, whereby the fabrication of the panel free from any "sag" is completed. In the case of heating the plate 2, the heating temperature of the plate 2 can be controlled in such a way that temperature sensors are previously disposed at the proper positions of the plate 2 as needed and that the detection signals of the temperature sensors during the heating process are operatively associated with the electric circuit of the grasp electrodes 3.

Concretely, one sensor may be set at the required lowest temperature and the other at the required highest temperature so as to control the heating temperature between such limits.

The predetermined temperature T during the step of heating the plate 2 is set so that the plate 2 may give rise to a required residual tensile stress, in consideration of the material of the plate 2, the ambient temperature, the strength of the skeleton, the handling of the plate 2 after the heating process, the period of time taken until the start of the finish welding since completion of the tacking, and so forth. An example of the predetermined temperature T will be calculated as to a case where a stainless steel plate 1.5 mm thick is employed for the plate 2, the ambient temperature is approximately 20° C., and the period of time taken until the start of the finish welding since the outer plate has been heated, removed from the electrodes, and tacked is approximately 1 minute.

It is known that a residual tensile stress necessary for preventing the occurrence of the welding distortion of the plate 2 after welding may be approximately 15 kg/mm². The temperature difference X between the plate 2 and the skeleton on which this plate is to be mounted, for developing the above residual tensile stress is evaluated with the following formula:

$$X = k \cdot \sigma / \sigma y$$

$\sigma$: tensile stress,
$\sigma y$: yield stress or proof stress value,
k: temperature difference at which a tensile stress corresponding to $\sigma y$ develops.

Figure 4:
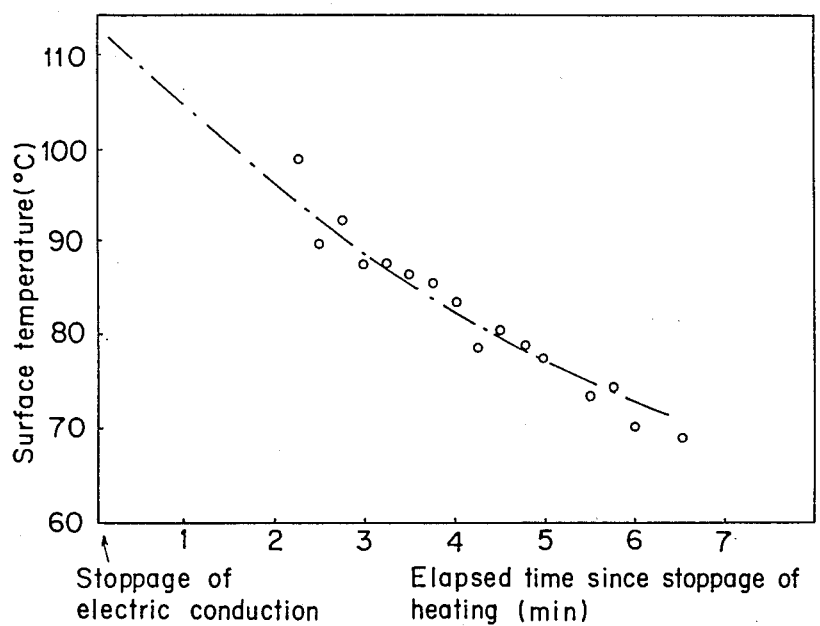
FIG. 4 is a diagram showing the cooling characteristics of a plate during the stage of natural cooling after heating.

When $\sigma = 15$ kg/mm², $\sigma y = 52.7$ kg/mm² and $k = 154°$ C. are respectively substituted into the above formula, the temperature difference X becomes approximately 44° C. Meanwhile, a cooling rate near, for example, 90° C. is read to be:

approximately 6° C./min from the diagram of the cooling curve of the stainless steel plate after the heating thereof as shown in FIG. 4. The temperature difference X is needed at the point of time at which the welding fixation of the plate 2 has been completed. Therefore, assuming that the period of time taken since the end of the heating until the completion of the tack welding is approximately 1 minute and that the ambient temperature, namely, the temperature of the skeleton is 20° C., the heating target temperature of the plate 2 becomes 20° C. + 44° C. + 6° C. = 70° C. Accordingly, the predetermined temperature T of the plate 2 during the production of the product should desirably be set at approximately 80° C. with some allowance made for the aforementioned heating target temperature.

In this connection, there will now be described the essential points of heating tests which were conducted as to conditions for uniformly heating at 80° C. stainless steel plates of various shapes to be applied to the plates 2.

Figure 5:
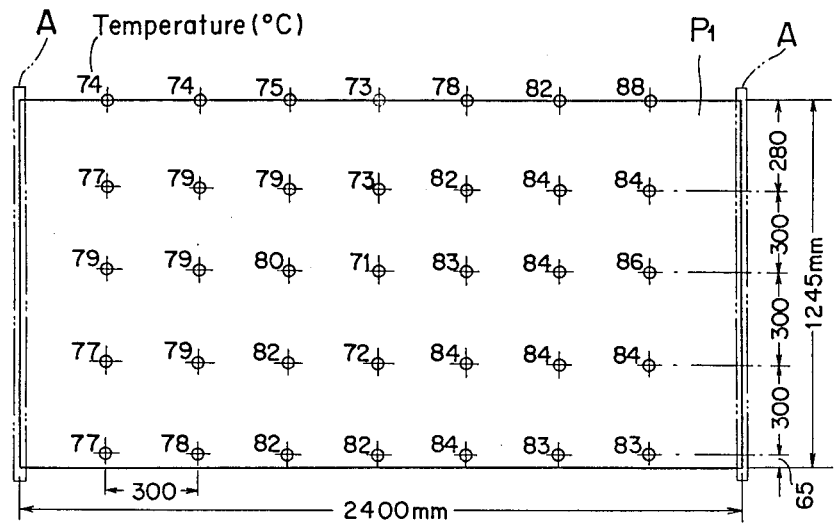
FIG. 5 is a diagram showing a temperature distribution characteristic of a heating test of a plate specimen.

FIG. 5 shows the surface temperatures (in °C.) of a plate measured when a test piece $P_1$ made of a stainless steel plate 1245 mm wide, 2400 mm long and 1.5 mm thick and having no cut-away part was subjected to a heating test by direct conduction heating using grasp electrodes A, A. This heating test was carried out under the conditions of a current value of 4000 amperes and a total conduction time (conduction with pulses at 20 Hz) of 3 minutes, and produced the favorable results of the highest temperature of 88° C. and the lowest temperature of 71° C.

Similarly, FIG. 6 shows the surface temperatures (in °C.) of a plate measured when a test piece $P_2$ made of a stainless steel plate, which was 1245 mm wide, 3155 mm long and 1.5 mm thick and which had a cut-away part B 950 mm wide and 1420 mm long centrally of the plate, was subjected to a heating test by direct conduction heating using grasp electrodes A, A. This heating test was carried out under the conditions of a current value of 3,100 amperes and a total conduction time (conduction with pulses at 20 Hz) of 3 minutes. Very intense actions of generating heat arose in both the sideward parts of the cut-away part B; and the highest temperature of 207° C. and the lowest temperature of 27° C. were measured.

Figure 7:
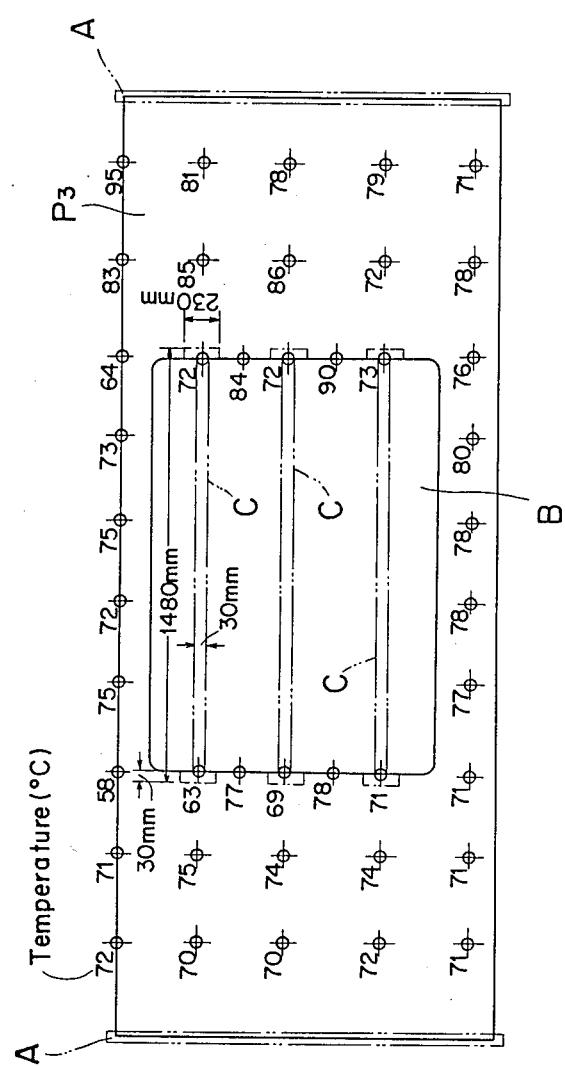

Shown in FIG. 7 are the surface temperatures (in °C.) of the plate in the case of a heating test in which, in order to eliminate such a conspicuous deviation in the temperature distribution, electric conduction members C each being made of an aluminum alloy plate 1.6 mm thick were interposed in the cut-away part B. This heating test was carried out under the conditions of a current value of 4,100 amperes and a total conduction time (conduction with pulses at 20 Hz) of three minutes. The deviation of the temperature distribution was sharply improved, and results close to the target heating temperature of 80° C. mentioned above were obtained. In order to raise the temperatures still further, the conduction time or the current value may be set at a higher level.

In the aforenoted embodiments, only flat plates have been exemplified. However, if the skeleton exhibits sufficient strength and can satisfactorily endure a residual tensile stress, even a panel which is, per se, in the shape of a curved surface will be able to be produced in accordance with the present invention. On that occasion, desirably the grasp electrodes are formed into a shape which conforms to the curved surface of the panel being produced.

In the case where the tack welding is executed without detaching the grasp electrodes, the total time between the period of time taken for detaching the electrodes and the period of time taken for moving the electrodes is saved, and in the case where the finish welding is executed immediately after the heating, the time with the period of time for the tack welding added to the above total time can be saved. Thus, the heating temperature can of course be lowered in correspondence with the saved time.

The present invention is constructed as described above. Thus, the first aspect of performance of the invention attains the effect that input energy can be readily adjusted in accordance with the material and dimensions of a plate and is very easily controlled with sensors. The second aspect of performance of the invention attains, besides the effect of the first aspect, the effect that a residual tensile stress for preventing the occurrence of sag can be developed for a plate having a cut-away part, so that the "sag" is conspicuously reduced. In addition, according to the third aspect of performance of the invention, resistance heating means for preheating a plate can be readily adapted to variations in the material, size and thickness of the plate and the geometries of a cut-away part by the use of grasp electrodes and electric conduction members, to attain the excellent effects that the quality of a panel product is enhanced, that the limitation of the size of a panel in the prior-art methods and apparatus for preventing sag is not encountered and that a temperature control can be performed very easily. All the aspects of performance are suited to flow processes and can render operations efficient.

Obivously, many modifications and variations of the present invention are possible in light of the above teachings. It is therefore to be understood that within the scope of the appended claims, the present invention may be practiced otherwise than as specifically described herein.

What is claimed is:

1. A method for preventing the sag of a panel, comprising the steps of:
    disposing a plate on a skeleton to which said plate is to be attached;
    gripping the upper and lower surfaces of said plate at end parts of said plate with grasp electrodes of resistance heating means;
    causing current to flow through said plate and said grasp electrodes so as to thereby preheat said plate to a predetermined temperature and thermally expand said plate;
    welding said thermally expanded plate to said skeleton; and
    developing a residual tensile stress in said plate owing to the thermal shrinkage deformation of said plate attendant upon cooling of said plate after said welding.

2. A method of preventing a sag of a panel, comprising the step of locating a plate on a skeleton to which said plate is to be attached, the step of gripping both end parts of said plate with grasp electrodes of resistance heating means and interposing electric conduction members for short-circuiting a cut-away part of said plate, in said cut-away part so as to form electric conduction paths, the step of causing current to flow through said plate across said grasp electrodes, thereby to preheat said plate to a predetermined temperature and to thermally expand it, the step of welding said plate to said skeleton, and the step of developing a tensile residual stress in said plate owing to a thermal shrinkage deformation attendant upon cooling of said plate after the welding.

3. A method of preventing a sag of a panel as defined in claim 1, wherein a temperature control of the resistance heating is performed by the use of temperature sensors.

4. An apparatus for preventing the sag of a panel which comprises a skeleton and a plate which is to be secured to said skeleton, comprising:
    support means for supporting said skeleton and said plate disposed upon said skeleton;
    resistance heating means for preheating said plate to a predetermined temperature so as to thermally expand said plate; and
    weld means for welding said thermally expanded plate to said skeleton whereby a residual tensile stress will be developed within said plate as a result of thermal shrinkage deformation of said plate attendant cooling of said plate after said welding of said plate to said skeleton,
    said resistance heating means including grasp electrodes for detachably gripping the upper and lower surfaces of said plate at end parts of said plate and for causing current to flow through said plate.

5. An apparatus for preventing a sag of a panel as defined in claim 4, wherein said resistance heating means includes electric conduction members which are detachable interposed in a cut-away part of said plate and which short-circuit said cut-away part.

6. A method of preventing a sag of a panel as defined in claim 2, wherein a temperature control of the resistance heating is performed by the use of temperature sensors.

7. A method as set forth in claim 1, wherein:
    said grasp electrodes are disposed upon opposite end parts of said plate.

8. A method as set forth in claim 1, wherein:
    said grasp electrodes are fabricated from a copper alloy.

9. A method as set forth in claim 1, wherein:
    said grasp electrodes are fabricated in the form of rectangular parallelepiped bar sections.

10. A method as set forth in claim 1, wherein:
    a first grasp electrode is disposed in contact with said upper surface of said plate;
    a second grasp electrode is disposed in contact with said lower surface of said plate; and
    said first and second grasp electrodes are retained upon said end parts of said plate by C-shaped clamping members.

11. A method as set forth in claim 10, wherein:
    said clamping members are fabricated from steel.

12. A method as set forth in claim 2, wherein:
    said electric conduction members are fabricated from an aluminum alloy.

13. A method as set forth in claim 2, wherein:
    said electric conduction members are fabricated so as to having a substantially I-shaped configuration as seen in a plan view.

14. A method as set forth in claim 10, wherein:
    said C-shaped clamping members are equidistantly spaced along the longitudinal extent of said grasp electrodes so as to insure uniform conduction performance.

15. Apparatus as set forth in claim 4, wherein:
    said grasp electrodes comprises elongated rectangular parallelepiped bar sections.

16. Apparatus as set forth in claim 4, wherein:
    said grasp electrodes comprise a copper alloy.

17. Apparatus as set forth in claim 4, further comprising:
    said grasp electrodes comprise a first grasp electrode disposed in contact with said upper surface of said plate, and a second grasp electrode disposed in contact with said lower surface of said plate; and
    C-shaped clamping members interconnecting said first and second upper and lower grasp electrodes so as to retain said first and second grasp electrodes upon said end parts of said plate.

18. Apparatus as set forth in claim 17, wherein:
    said clamping members comprise steel.

19. Apparatus as set forth in claim 17, wherein:
    said clamping members are equidistantly spaced along the longitudinal extent of said grasp electrodes so as to insure uniform conduction performance.

20. Apparatus as set forth in claim 5, wherein:
    said electric conduction members comprise an aluminum alloy.

* * * * *